(12) United States Patent
Near

(10) Patent No.: US 6,905,777 B2
(45) Date of Patent: Jun. 14, 2005

(54) LAMINATE MATERIAL

(76) Inventor: Shannon D. Near, 2484 Village Dr. SE., Bldg. 9, Grand Rapids, MI (US) 49506

( * ) Notice: Subject to any disclaimer, the term of this patent is extended or adjusted under 35 U.S.C. 154(b) by 183 days.

(21) Appl. No.: 10/418,805

(22) Filed: Apr. 18, 2003

(65) Prior Publication Data

US 2004/0209092 A1 Oct. 21, 2004

(51) Int. Cl.[7] .......................... B32B 15/04; B32B 31/00
(52) U.S. Cl. .................... 428/469; 428/607; 428/414; 428/474.4; 428/477.7; 428/478.8; 428/479.6; 428/542.2; 428/913.3; 428/926; 156/60; 156/61; 156/325
(58) Field of Search .................... 428/469, 607, 428/414, 474.4, 477.7, 478.8, 479.6, 542.2, 913.3, 926; 156/60, 61, 325

(56) References Cited

U.S. PATENT DOCUMENTS

| | | | |
|---|---|---|---|
| 3,808,000 A | | 4/1974 | Magnotta et al. |
| 3,959,091 A | | 5/1976 | Moji et al. |
| 4,049,504 A | | 9/1977 | Chu et al. |
| 4,127,451 A | * | 11/1978 | Marceau et al. ............ 428/469 |
| 4,292,353 A | | 9/1981 | Ohashi et al. |
| 4,560,623 A | | 12/1985 | Iwata et al. |
| 4,650,813 A | | 3/1987 | Kooda et al. |
| 4,859,288 A | | 8/1989 | Furneaux et al. |
| 4,894,127 A | | 1/1990 | Wong et al. |
| 5,131,987 A | | 7/1992 | Nitowski et al. |
| 5,324,587 A | | 6/1994 | Nitowski et al. |
| 6,365,276 B1 | | 4/2002 | Rudisi et al. |
| 6,420,309 B1 | | 7/2002 | Grime et al. |
| 6,500,558 B2 | | 12/2002 | Yamaguchi |

OTHER PUBLICATIONS

Article by Gregory S. Marczak and Philip O. Wakeling, Lorin Industries, Muskegon, MI, entitled, "Production of Adhesive Substrate Using Phosphoric Acid and a Continuous Coil Operation," presented to the American Electroplaters and Surface Finishers Society (AESP) Annual Technical Conference, Jun. 26–29, 2000.

* cited by examiner

Primary Examiner—Robert R. Koehler
(74) Attorney, Agent, or Firm—Price, Heneveld, Cooper, DeWitt & Litton, LLP

(57) ABSTRACT

A laminate composite that includes a phosphoric acid anodized metal layer that includes an anodic film of from between about 0.005 mils to about 0.015 mils thick as measured through standard acid dissolution testing; an adhesive layer; a top layer adhered to the metal layer at least in part by the adhesive layer; and wherein the metal includes a metal chosen from the group that includes an aluminum and an aluminum alloy.

38 Claims, 1 Drawing Sheet

LAMINATE MATERIAL

BACKGROUND OF THE INVENTION

Conventionally, decoratively laminated materials, particularly those having a metal base layer have been produced to simulate the look of wood grain, stone, or other decorative patterns. These laminated materials are useful in many applications for both the interior and exterior of a building if they possess durable, yet lightweight characteristics. These decorative laminate materials generally include a metal backing, an adhesive layer, and a decorative top layer substrate. The laminates were generally produced in one of two ways. First, the metal material could be mechanically scrapped or roughed up using a sander or other similar material or device. The rough surface would help allow the adhesive to bond the metal backing layer to the decorative top substrate.

The second method previously employed to manufacture decorative laminate materials having a metal backing, an adhesive layer, and a decorative top layer substrate involved the use of a chromium solution dip or chromium solution roll-on application to essentially form an extremely fine rough coating on the metal backing layer. This extremely fine rough coating added to the ability of the adhesive to adhere the metal backing to the decorative top layer substrate. Using the brushed method, a bond strength of two pounds per inch as measured by the ASTM 1876 T-peel test was typically achieved, whereas using a dry-in-place chromium solution or dip chromium solution method yielded fours pound per inch bond strength as measured by the ASTM 1876 T-peel test.

In the past, the insufficient bond strength between the metal layer and the top layer of the laminates achieved by these two previously used methods resulted in easy separation of the layers. The insufficient bond strength between the metal layer and the top layer was often exacerbated by temperature degradation or by other environmental conditions. Moreover, laminate materials previously produced were undesirable to the industry because they were not readily bendable and formable to a given contour without the top layer becoming damaged and/or separated from the metal backing substrate layer.

Conventional laminated metals exhibited other disadvantageous characteristics as well. In the past, fabricating a desired shape from the laminated materials after the decorative top was applied would result in a frosted, whitened, stretched, blotchy, discolored, or non-uniform appearance of the laminate material. Metal articles often had to be fabricated into a desired shape before the decorative top layer was applied to avoid degradation of the appearance of the laminate material, significantly adding to the cost and difficulty of the lamination process.

Accordingly, there is a significant need for a cost effective, efficient, bendable, and formable laminate material with enhanced adhesive properties that would avoid the degradation in appearance of the top layer of the composite produced by earlier processes and the burden of the fabrication of a laminate material into a desired shape prior to application of the decorative top layer.

The present invention generally relates to a method of producing an improved laminate material that has flexible and formable characteristics and the flexible, formable laminate material produced thereby.

SUMMARY OF THE INVENTION

One embodiment of the present invention includes a laminate composite having a phosphoric acid anodized metal layer with an anodic film of from between about 0.005 mils to about 0.015 mils thick as measured through standard acid dissolution testing, an adhesive layer, and a top layer adhered to the metal layer at least in part by the adhesive layer. The metal layer includes a metal chosen from the group comprising aluminum and an aluminum alloy.

In yet another embodiment of the present invention, a composite includes an anodized metal layer having an anodic film between about 0.005 mils and about 0.015 mils thick and a top layer adhered to the anodized metal layer such that the anodized metal layer and the adhesive layer form an interface having a minimum bond strength of about 9 lbs./in. as measured by the ASTM 1876 T-peel test.

Another embodiment of the present invention includes a method of producing a composite laminate material by providing a top layer and a metal layer, cleaning the surface of the metal layer, rinsing the metal layer, anodizing the surface of the metal layer to form an anodic film between about 0.005 mils and about 0.015 mils thick as measured through standard acid dissolution testing, rinsing the anodized metal layer, drying the anodized metal layer, adhering the top layer to the anodized metal layer to form a composite laminate material having an adhesive to anodized metal layer interface, curing the composite laminate material. The adhesive to anodized metal layer interface typically has a minimum bond strength of about 9 lbs./in. as measured by the ASTM 1876 T-peel test.

Yet another embodiment of the present invention includes a laminate composite having a phosphoric acid anodized metal layer and a top layer having a thickness of between about 6 mils and about 40 mils adhered to the phosphoric acid anodized metal layer to form a laminate composite that is formable without substantial degradation of the top layer.

In another embodiment, the present invention includes a laminate material having a phosphoric anodized metal layer including a base metal layer and an anodic film layer where the base metal layer is from about 0.004 in. to about 0.250 in. thick; the anodic film layer is between about 0.005 mils and about 0.015 mils thick as measured through standard acid dissolution testing, and the metal base layer includes a metal chosen from: aluminum at a purity of 99.9% aluminum or greater; an aluminum alloy where the alloying constituent is copper, magnesium, manganese, zinc, tin, silicon, or any combinations thereof; or any combination thereof. The laminate material further includes an adhesive layer forming an interface between the anodized metal layer and the adhesive layer where the adhesive layer includes a polyamide resin, an epoxy resin, a polyurethane reactive and combinations thereof; and where the interface between the anodized metal layer and the adhesive layer has a minimum bond strength of about 9 lbs./in. as measured by ASTM 1876 T-peel testing. The laminate material further includes a decorative top layer adhered to the phosphoric anodized metal layer at least in party by the adhesive layer.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
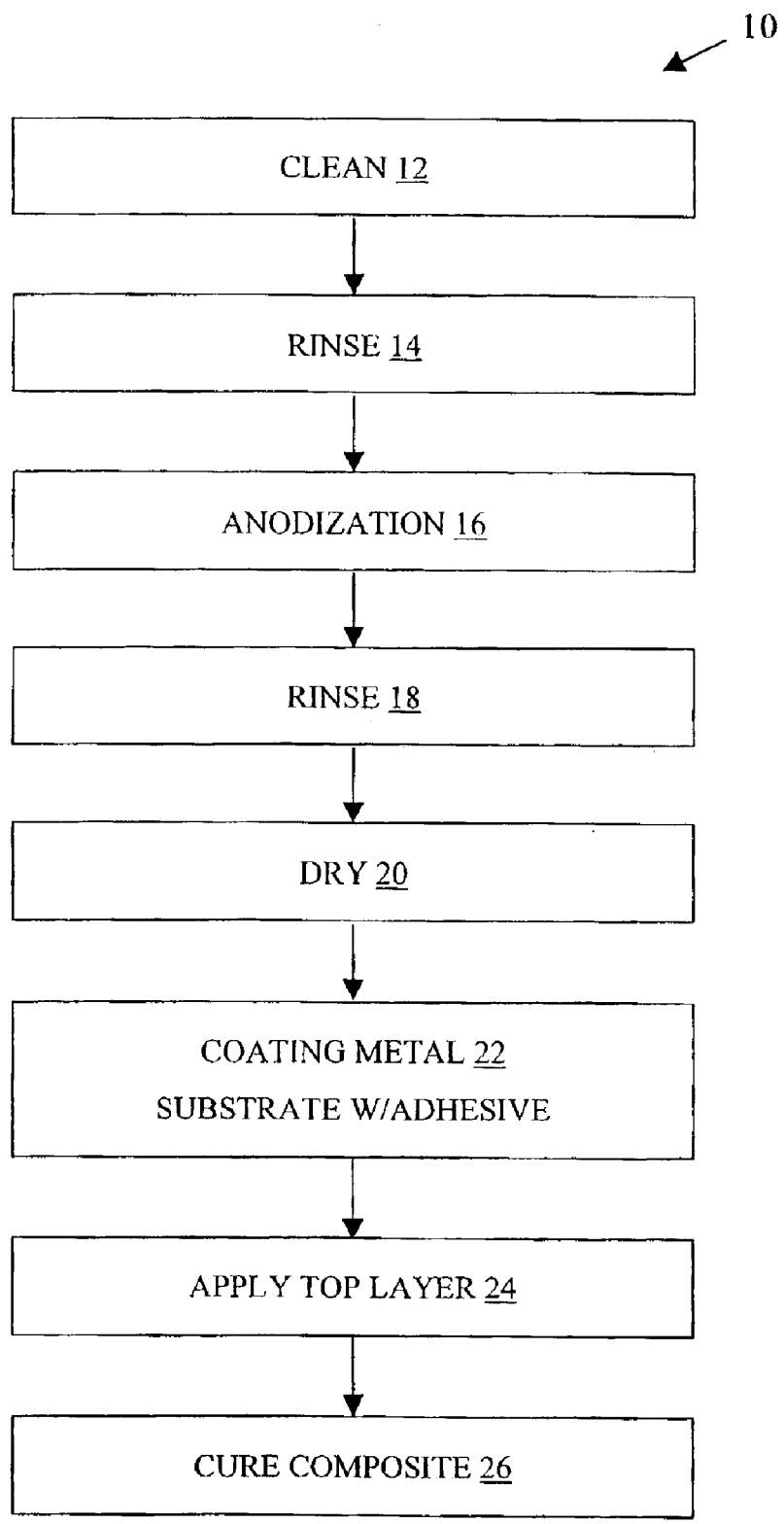
FIG. 1 shows a flow chart of a process for producing an embodiment of the laminate material of the present invention.

The present invention includes a multi-layered laminate composite material that possesses superior bond strength between the top layer and the metal substrate layer. The process of the present invention results in a superior bond allowing the highly flexible and formable laminate material to be formed, pressed, shaped, bent, or drawn after the decorative top layer has been applied without a degradation of appearance of the laminate material.

The metal substrate layer of the laminate material of the present invention typically consists of a metal layer of varying thickness from about 0.004 inches to about 0.100 inches in gauge. The metal layer may consist of sheets, coils, rolls, extrusions, bars, rods, shapes, or any other shaped metal piece. The metal may be an alloy of aluminum, magnesium, or titanium, but is more typically an aluminum alloy. When an aluminum alloy is used, the aluminum layer may be of any known alloy as detailed in the Aluminum Association's standards under the classifications of 2XXX, 3XXX, 4XXX, 5XXX, 6XXX, 7XXX, 8XXX, 9XXX, or any modification thereof. The metal layer may also include a non-alloyed metal, typically aluminum, at a purity of at least about 99.0%. When the non-alloyed metal is aluminum, 99.0% aluminum or greater as detailed by the Aluminum Association's standards under the 1XXX classification is typically used. The typically aluminum metal layer may be an alloy where the primary alloy constituent is copper, magnesium, manganese, zinc, tin, silicon, or any combination thereof. The exact makeup of the aluminum metal layer is not thought to be critical at this time. As will be discussed later, the metal layer is typically anodized.

The top layer typically consists of a decorative layer of printed vinyl, polyester, urethane, polyolefin, paper, or any combination thereof, upon which other layers of material may also be applied for various reasons that could include scratch resistance, abrasion resistance, graffiti resistance, added depth to the top layer appearance, a carrier for anti-microbial agents, weather resistance, stain resistance, and sound deadening. The top layer may consist of printed material that simulates various building materials, including, but not limited to, wood grain patterns of all species of wood, stone, rock, leather, Kevlar®, any type of painted surface, goldleaf, plated surfaces, graphite, dyed surfaces, plated silver, powder coated surfaces, and minerals. Essentially, any type of material that can be simulated on a printed material may be used. The printed material is typically produced in various ways to add significant realism to the appearance of the laminate material to promote flexibility of the surface without degradation of the appearance. Manufacturing techniques used to produce the printed material include folding, bellowing, and pre-saturating to allow the material to be formed and shaped without separation of the printing that might result in a degradation appearance of the material. Typically, the top layer is from about 6 mils to about 40 mils thick, but more typically is from about 6 mils to about 20 mils thick.

One way to add significant realism to the appearance of the laminate is to photograph a pattern from more than one position. These images are then recorded on a computer, and used to etch a series of chrome cylinders, which emboss the grain or texture into the printed material. After embossing, a coloring agent may optionally be added into the grain, adding realism and depth. This printing process is useful for any type of decorative pattern, including the multitude of wood grain patterns of different species of wood. This printing process, and any others known to one of ordinary skill in the art, can be performed on any suitable decorative layer, including printed vinyl, polyester, urethane, paper, or any combination thereof.

Typically, the present invention further includes an adhesive layer positioned between the top layer and the metal substrate layer to adhere the top layer to the metal substrate layer. However, conceivably, an adhesive might be incorporated into the material of the top layer, but typically in such instances, the adhesive would likely leech into the jagged crevices or pores on the surface of the anodized metal layer that results from the phosphoric acid anodization of the metal layer. These same jagged crevices or pores are currently believed to result in superior bonding strength because there is more surface area for the adhesive to bond to and more stearic hindrances to separation. When an adhesive layer is used, the adhesive layer is presently typically between about 1 mil to about 3 mils thick. This construction yields two interfaces, one between the metal layer, typically anodized, and the adhesive layer and a second interface between the top layer and the adhesive layer. Typically, the adhesive layer includes a flexible bonding agent for the purpose of holding the top layer to the metal substrate layer.

The adhesive layer is typically capable of withstanding forming applications, such as drawing, bending, breaking, pressing, roll-forming, and other industrial forming techniques without becoming brittle, fracturing, cracking, or failing to maintain a minimum of nine pounds per inch bond strength as measured by ASTM (American Society for Testing and Materials) 1876 T-peel testing. This testing method is generally known to those of ordinary skill in the art, but basically involves two small pieces of metal being tested that are adhered with a special glue. One end of the two pieces of material is not glued and the pounds per inch of force required to pull the materials apart is measured. Typically, no solvents are used in the adhesive process, thereby making the process very environmentally friendly compared to other processes, but solvent processes could be used in the present invention.

The actual materials typically used as the adhesive layer may include polyamides of various types, epoxides of various types, polyurethane reactives, or any other adhesive known to one of ordinary skill in the art for adhering metal with a ceramic/anodic layer to a typically decorative top layer. Typically, however, a polyamide and epoxide mixture at a ratio of about 1:1 is preferred because it is not as brittle as other adhesives, but is extremely strong, having bond strengths up to from about 20 lbs./in. to about 60 lbs./in. as measured by the ASTM 1876 T-peel testing method discussed above. Moreover, any other adhesive layer may be used in liquid, dry woven web, dry non-woven web, spray, or powder form. The adhesive typically has thermoplastic qualities at various temperatures and may be cured through a variety of methods, including oven heat, infrared heat, radiant heat, electric heat, or ambient air drying.

The process 10 used to produce the laminate material of the present invention typically includes cleaning the metal substrate layer 12, rinsing the metal substrate 14, anodizing the metal substrate layer 16, rinsing the anodized metal substrate 18, typically in a second water bath, drying the metal substrate layer 20, coating the metal substrate layer with an adhesive 22, applying the top layer to the metal substrate layer 24, and curing the resultant composite 26.

When anodizing the metal substrate layer, typically a phosphoric acid anodizing bath is utilized. Also, various parameters, including dwell, tank temperature, voltage, amperage, and acid concentration may be adjusted so as to produce an oxide film layer between the thickness of about 0.000005 inches (0.005 mils) and about 0.000015 inches (0.015 mils) as measured through standard acid dissolution testing. One of ordinary skill in the art will realize that there may be a need to change the anodizing parameters for different gauges, widths, and alloys, but the result of the oxide layer should typically result in the above thickness range.

The aluminum or other metal is typically anodized by passing the aluminum through a series of chemical baths. The first bath, the chemical degreaser/cleaner stage, cleans the aluminum or other metal of all oils, grease, loose oxides, etc. in order to promote the growth of a uniform anodic layer. This can be accomplished through the use of any mild acidic or alkaline cleaner designed for use with the metal being anodized. The next stage is typically a rinse, which rinses off any cleaner residue from the aluminum or other metal. Thereafter, the metal layer is typically phosphoric acid anodized utilizing an electrochemical anodizing cell containing phosphoric acid as the main additive to a water bath. After anodizing, the metal layer is typically rinsed to remove any remaining anodizing solution. Finally, the metal substrate layer is dried using ambient air, infrared drying methods, gas fired heaters, or radiant heaters. Once the steps have been completed, the metal substrate layer is prepared to be laminated.

Once prepared to be laminated, the metal substrate layer is typically coated with an adhesive. The adhesive application can include any technique known by one of ordinary skill in the art, including roll coating, spraying, continuous waterfall-type application with slotted tubes or hoses, reverse roll coating, impregnation coating, metered roll coating, fogging, or squeegee applications. The adhesive may be in the form of a liquid, powder, woven web, non-woven web, solid, or spray. The form of the adhesive is not critical. As discussed above, it may be possible to incorporate the adhesive into the top layer. If, for example, a resin is used as the top layer, it is conceivable that an adhesive may be incorporated within the resin such that the adhesive layer as a separate layer may be omitted.

Once the adhesive layer has been applied, the typically decorative top layer may be applied by any method known by one of ordinary skill in the art, including nip roll laminating, continuous nip roll laminating, continuous belt laminating, squeegee, plate pressing, or platen pressing. Once the completed laminate material composite is formed, the composite is allowed to fully cure. As discussed above, the curing may be accelerated by heat, infrared heat, radiant heat, electric heat, or may be allowed to more slowly dry using ambient air drying. The resultant composite formed by the process discussed above typically has an adhesive strength of the top layer to the metal backing layer of at least about nine pounds per inch bond strength as measured by ASTM 1876 T-peel testing, but the bond strength is more typically at least from about 20 to about 60 pounds per inch as measured by this same test, but is most typically from about 20 lbs./in. to about 40 lbs./in.

The laminate composite material of the present invention is capable of at least about 0T (0 (zero) times the thickness of the material), bending without substantial degradation of the appearance of the top layer. Also, the composite may be bent at multiple bends, each at least up to about a 0T bend without substantial degradation of the appearance of the top layer, due to its adhesive strength and the fact that it is both formable and bendable after the laminate composite material has been completely formed, has many unique applications. This allows for lips and grooves, for example, to be bent into the material without degradation of the decorative top layer. In instances that require aggressive forming, slight heating of the top decorative layer to temperatures of about from about 55° C. to about 65° C. and more typically about 60° C. can be used to facilitate elimination of crazing or whitening of the top decorative layer. The heating is typically done using infrared, convection, or other heating methods known and/or used by one of ordinary skill.

The laminate composite material has innumerable potential uses and may be used in architectural materials, such as wall panels, column covers, interior cladding, exterior cladding, soffits, fascia, window channels, home cladding, home siding, or any other building material, where a decorative laminate composite might be used. The laminate composite material may also be used in more commercial environments, such as partitions, racking and shelving units, countertop displays, and signage. The laminate composite material also has usage in the furniture industry, such as desktops, side panels for furniture, cabinetry components, and moldings. Other commercial products that might incorporate laminate composite material of the present invention include automobile interior decorative components, such as dashboards or door components, transit panels, such as used in railways, honeycomb panels, such as used in the aerospace industry, lighting components, switch plates, picture frames, face and side panels for appliances, heating and cooling ducts, and packaging components. Other markets where the laminate composite material may be used include stamped forms, drawn forms, stamped molding, roll-form molding, and stamped switch plates.

The following processes for preparing the metal substrate layer are disclosed to simulate typical production conditions for preparing an aluminum coil substrate layer. Alternatively shaped aluminum metal substrate layers may require different production conditions. The anodic film thickness, however, will typically dictate any deviations from these settings and times. The amperage, dwell time, and voltage can vary even when running an identical metal in the same baths within hours of the first running. Factors that can require changes in the settings include slight deviations in the metal gauge, differences in the chemical composition of one alloy to another, and gradual changes in concentration and pH of the chemical baths as they age or when more material is run through them. The line operator must make adjustments accordingly as is warranted by the film thickness, by adjusting the electrical input and/or adjusting the dwell time.

EXAMPLE 1

A degreasing bath is prepared with a solution of the cleaner BetzKleen 4611. The BetzKleen 4611 is heated to 150 F. An aluminum coil having a gauge of 0.020 inches thick is immersed into the degreasing bath for 1 minute. The aluminum coil is immersed into a water bath containing de-ionized water. The aluminum coil is next immersed into an electro-chemical anodizing cell having 30% phosphoric acid in a water bath. The dwell time is 48 seconds. The temperature of the anodizing cell maintained within the range of 180–210 F. The amperage is monitored and adjusted by a line operator to obtain an anodic film having a thickness of approximately 0.015 mils. The voltage is maintained between the range of 18 V to 22 V. The anodized aluminum layer is then immersed in a final warm water bath and dried by a convection oven or blower.

EXAMPLE 2

A degreasing bath is prepared with a solution of the cleaner BetzKleen 4611. The BetzKleen 4611 is heated to 150 F. An aluminum coil having a gauge of 0.040 inches thick is immersed into the degreasing bath for 1 minute. The aluminum coil is immersed into a water bath containing de-ionized water. The aluminum coil is next immersed into an electrochemical anodizing cell having 30% phosphoric acid in a water bath. The dwell time is 55 seconds. The temperature of the anodizing cell maintained within the range of 180–210 F. The amperage is monitored and adjusted by a line operator to obtain an anodic film having a thickness of approximately 0.014 mils. The voltage is maintained between the range of 18 V to 22 V. The anodized aluminum layer is then immersed in a final warm water bath and dried by a convection oven or blower.

The above description is considered that of the preferred embodiment(s) only. Modifications of the invention will occur to those skilled in the art and to those who make or use the invention. Therefore, it is understood that the embodiment(s) shown in the drawings and described above is merely for illustrative purposes and not intended to limit the scope of the invention, which is defined by the following claims as interpreted according to the principles of patent law, including the doctrine of equivalents.

The invention claimed is:

1. A laminate composite comprising:
   a phosphoric acid anodized metal layer comprising an anodic film of from between about 0.005 mils to about 0.015 mils thick as measured through standard acid dissolution testing;
   an adhesive layer;
   a top layer adhered to the metal layer at least in part by the adhesive layer; and
   wherein the metal comprises a metal layer chosen from the group comprising aluminum and an aluminum alloy.

2. The laminate composite of claim 1, wherein the multi-layer laminate material is formable without substantial degradation of the appearance of the top layer.

3. The laminate composite of claim 1, wherein the anodized metal layer is within the thickness range of 0.004 in. and 0.250 in.

4. The laminate composite of claim 3, wherein the anodized metal layer comprises an anodized metal layer from the group comprising sheets, coils, rolls, extrusions, rods, bars, shapes, pieces, and combinations thereof.

5. The laminate composite of claim 2, wherein the anodized metal layer comprises a non-alloyed aluminum having a purity of about 99.0% aluminum or greater.

6. The laminate composite of claim 2, wherein the anodized metal layer comprises an aluminum alloy, wherein the alloying constituent comprises copper, magnesium, manganese, zinc, tin, silicon, or any combinations thereof.

7. The laminate composite of claim 2, wherein the top layer comprises a decorative element produced using vinyl, polyester, urethane, polyolefin, paper, or any combinations thereof.

8. The laminate composite of claim 7, wherein the anodized metal layer and the adhesive layer form an interface and comprises a minimum bond strength of about 9 lbs./in. as measured by the ASTM 1876 T-peel test.

9. The laminate composite of claim 1, wherein the top layer comprises a printed material produced using a printing process.

10. The laminate composite of claim 9, wherein the printing process comprises recording on a computer at least one image of a pattern; etching a series of chrome cylinders with a pattern of the image and embossing the pattern into the top layer.

11. The laminate composite of claim 2, wherein the decorative layer is subjected to a manufacturing technique comprising folding, bellowing, pre-saturating, or combinations thereof prior to adhesion to anodized aluminum layer.

12. The laminate composite of claim 1, wherein the adhesive layer comprises an adhesive comprising a 1:1 ratio of polyamide component to epoxide component, polyamide resin, an epoxy resin, a polyurethane reactive, and combinations thereof.

13. The laminate composite of claim 12, wherein the adhesive layer comprises an adhesive chosen from the group comprising liquid adhesives, dry woven web adhesives, dry non-woven web adhesives, spray adhesives, or powder adhesives.

14. The laminate composite of claim 1, wherein the adhesive layer comprises an adhesive chosen from the group comprising liquid adhesives, dry woven web adhesives, dry non-woven web adhesives, spray adhesives, or powder adhesives.

15. The laminate composite of claim 1, wherein the method of applying the adhesive layer comprises roll coating, spraying, continuous hosing application, reverse roll coating, impregnation coating, metered roll coating, fogging, squeegee application or combinations thereof.

16. The laminate composite of claim 1, wherein the anodized metal layer and the adhesive layer form an interface and the adhesive to anodized metal layer interface comprises a minimum bond strength of about 9 lbs./in. as measured by the ASTM 1876 T-peel test.

17. A composite comprising:
   an anodized metal layer having an anodic film between about 0.005 mils and about 0.015 mils thick and a top layer adhered to the anodized metal layer such that the anodized metal layer and the adhesive layer form an interface comprising a minimum bond strength of about 9 lbs./in. as measured by the ASTM 1876 T-peel test.

18. The composite of claim 17, wherein the adhesive to anodized metal layer interface comprises a bond strength of from about 20 lbs./in. to about 60 lbs./in. as measured by the ASTM 1876 T-peel test.

19. The composite of claim 17, wherein the anodized metal layer is anodized using phosphoric acid.

20. The composite of claim 18, wherein the anodized metal layer is anodized using phosphoric acid.

21. The method of claim 17, wherein the top layer is subjected to a printing process comprising:
   recording on a computer at least one image of a pattern; etching a series of chrome cylinders with a pattern of the image and embossing the pattern into the top layer.

22. A method of producing a composite laminate material comprising:
   providing a top layer and a metal layer;
   cleaning the surface of the metal layer;
   rinsing the metal layer;
   anodizing the surface of the metal layer to form an anodic film between about 0.005 mils and about 0.015 mils thick as measured through standard acid dissolution testing;
   rinsing the anodized metal layer;
   drying the anodized metal layer;
   adhering the top layer to the anodized metal layer to form a composite laminate material having an adhesive to anodized metal layer interface;
   curing the composite laminate material; and
   wherein the adhesive to anodized metal layer interface comprises a minimum bond strength of about 9 lbs./in. as measured by the ASTM 1876 T-peel test.

23. The method of claim 22, wherein the metal layer comprises a thickness of from about 0.004 in. to about 0.250 in.

24. The method of claim 23, wherein the metal layer comprises an aluminum alloy, wherein the alloying constituent comprises an alloying constituent chosen from the group comprising copper, magnesium, manganese, zinc, tin, silicon, and any combinations thereof.

25. The method of claim 22, wherein the top layer comprises a decorative element produced using vinyl, polyester, polyolefin, urethane, paper, or combinations thereof.

26. The method of claim 25, wherein the decorative layer is subjected to a manufacturing technique comprising a manufacturing technique chosen from the group comprising folding, bellowing, pre-saturating, and any combination thereof prior to adhesion to anodized aluminum layer.

27. The method of claim 22, wherein the top layer is subjected to a printing process comprising: recording on a computer at least one image of a pattern; etching a series of chrome cylinders with a pattern of the image and embossing the pattern into the top layer.

28. A method of producing a composite laminate material comprising:

providing a top layer and a metal layer;

cleaning the surface of the metal layer with a mild acidic or alkaline cleaner;

rinsing the metal layer;

anodizing the surface of the metal layer until the metal layer comprises an anodic film between about 0.005 mils and about 0.015 mils thick as measured through standard acid dissolution testing;

rinsing the anodized metal layer;

drying the anodized metal layer;

applying an adhesive layer to the anodized metal layer to form an interface;

adhering a top layer to the anodized metal layer to form a composite laminate material;

curing the composite laminate material; and wherein the adhesive to anodized metal layer interface comprises a minimum bond strength of about 9 lbs./in. as measured by the ASTM 1876 T-peel test.

29. The method of claim 20, wherein the metal layer comprises a thickness of from about 0.004 to about 0.250 in.

30. The method of claim 24, wherein the metal layer comprises an aluminum alloy, wherein the alloying constituent comprises an alloying constituent chosen from the group comprising copper, magnesium, manganese, zinc, tin, silicon, and any combinations thereof.

31. The method of claim 20, wherein the top layer comprises a decorative element produced using vinyl, polyester, polyolefin, urethane, paper, or combinations thereof.

32. The method of claim 23, wherein the top layer is subjected to a manufacturing technique comprising a manufacturing technique chosen from the group comprising folding, bellowing, pre-saturating, and any combination thereof prior to adhesion to anodized aluminum layer.

33. The method of claim 28, wherein the top layer is subjected to a printing process comprising:

recording on a computer at least one image of a pattern; etching a series of chrome cylinders with a pattern of the image and embossing the pattern into the top layer.

34. The laminate composite produced by the method of claim 28.

35. A laminate composite comprising a phosphoric acid anodized metal layer and a top layer having a thickness of between about 6 mils and about 40 mils adhered to the phosphoric acid anodized metal layer to form a laminate composite, wherein the laminate composite is formable without substantial degradation of the top layer.

36. The laminate composite of claim 35, wherein the composite is capable of up to a 0T bend without substantial degradation of the appearance of the top layer.

37. A laminate material comprising:

a phosphoric anodized metal layer comprising a base metal layer and an anodic film layer, wherein the base metal layer is from about 0.004 in. to about 0.250 in. thick; the anodic film layer is between about 0.005 mils and about 0.015 mils thick as measured through standard acid dissolution testing, and the metal base layer comprises a metal chosen from the group comprising aluminum at a purity of 99.9% aluminum or greater; an aluminum alloy wherein the alloying constituent comprises an alloying constituent chosen from the group comprising copper, magnesium, manganese, zinc, tin, silicon, and any combinations thereof; or any combination thereof;

an adhesive layer forming an interface between the anodized metal layer and the adhesive layer, wherein the adhesive layer comprises a polyamide resin, an epoxy resin, a polyurethane reactive and combinations thereof; and wherein the interface between the anodized metal layer and the adhesive layer comprises a minimum bond strength of about 9 lbs./in. as measured by ASTM 1876 T-peel testing; and a decorative top layer adhered to the phosphoric anodized metal layer at least in part by the adhesive layer.

38. The laminate material of claim 37, wherein the decorative top layer comprises vinyl, polyester, urethane, polyolefin, paper, or any combinations thereof.

* * * * *